(12) United States Patent
Kim

(10) Patent No.: US 12,134,347 B2
(45) Date of Patent: Nov. 5, 2024

(54) LAMP SYSTEM

(71) Applicant: HYUNDAI MOBIS CO., LTD., Seoul (KR)

(72) Inventor: Myeong Je Kim, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 28 days.

(21) Appl. No.: 18/066,871

(22) Filed: Dec. 15, 2022

(65) Prior Publication Data

US 2024/0067081 A1 Feb. 29, 2024

(30) Foreign Application Priority Data

Aug. 30, 2022 (KR) .................. 10-2022-0109120

(51) Int. Cl.
*B60Q 1/50* (2006.01)
*B60Q 1/04* (2006.01)

(52) U.S. Cl.
CPC .............. *B60Q 1/50* (2013.01); *B60Q 1/04* (2013.01); *B60Q 2400/50* (2013.01)

(58) Field of Classification Search
CPC ... B60Q 1/50; B60Q 1/04; B60Q 1/38; B60Q 1/54; B60Q 1/503; B60Q 2400/50
See application file for complete search history.

(56) References Cited

U.S. PATENT DOCUMENTS

| | | | | |
|---|---|---|---|---|
| 5,379,369 A * | 1/1995 | Komma | ............... | H04N 13/261 |
| | | | | 348/E13.064 |
| 9,278,646 B2 * | 3/2016 | Mochizuki | ........... | G06V 20/588 |
| 10,118,537 B2 * | 11/2018 | Kunii | .................. | H04N 9/3188 |
| 10,434,933 B2 * | 10/2019 | Kunii | .................. | H04N 9/3194 |
| 10,457,199 B2 * | 10/2019 | Kunii | ...................... | B60Q 1/38 |
| 10,611,296 B2 * | 4/2020 | Kunii | ............... | G08G 1/096791 |
| 10,647,248 B2 * | 5/2020 | Kunii | .................. | H04N 9/3185 |
| 10,794,719 B2 * | 10/2020 | Kunii | ...................... | B60Q 1/08 |
| 10,933,800 B2 * | 3/2021 | Kunii | ..................... | G03B 17/54 |
| 11,247,605 B2 * | 2/2022 | Kunii | .................. | H04N 9/3194 |

(Continued)

FOREIGN PATENT DOCUMENTS

DE    10 2020 129546    5/2022
KR    2022-0091243      6/2022

OTHER PUBLICATIONS

English Language Abstract of DE 10 2020 129546 published May 12, 2022.

(Continued)

*Primary Examiner* — Hoi C Lau
(74) *Attorney, Agent, or Firm* — DLA Piper LLP US

(57) ABSTRACT

A lamp system capable of improving ease of use by outputting an image without distortion when one image is divided and output from the left and right lamps, respectively. The lamp system includes a left lamp installed on a left side of a moving object in one direction to output an allocated first image, a right lamp installed on a right side of the moving object in one direction to output an allocated second image, and a control unit receiving original image information from the outside to allocate the first image and the second image to the left lamp and the right lamp, respectively, based on the original image but change and allocate an overlapping area that is an overlapping portion of the first image and the second image.

10 Claims, 11 Drawing Sheets

(56) References Cited

U.S. PATENT DOCUMENTS

| | | | | |
|---|---|---|---|---|
| 11,249,341 | B2* | 2/2022 | Kunii | H04N 9/3179 |
| 11,340,089 | B2* | 5/2022 | Kunii | B60Q 1/08 |
| 11,414,009 | B2* | 8/2022 | Kunii | G08G 1/096716 |
| 11,691,560 | B2* | 7/2023 | Kunii | G03B 21/26 |
| | | | | 340/425.5 |
| 11,701,994 | B2* | 7/2023 | Kunii | G08G 1/167 |
| | | | | 362/538 |
| 11,719,930 | B2* | 8/2023 | Lee | G06T 19/006 |
| | | | | 348/340 |
| 11,752,870 | B2* | 9/2023 | Kunii | B60Q 1/04 |
| | | | | 348/744 |
| 2001/0028393 | A1* | 10/2001 | Tomida | B60R 1/00 |
| | | | | 348/148 |
| 2003/0052837 | A1* | 3/2003 | Raskar | H04N 9/12 |
| | | | | 345/32 |
| 2011/0234921 | A1* | 9/2011 | Ivashin | H04N 9/3147 |
| | | | | 348/E3.048 |
| 2015/0224926 | A1* | 8/2015 | Mochizuki | B60R 1/00 |
| | | | | 701/36 |
| 2016/0167566 | A1* | 6/2016 | Tanaka | F21S 41/663 |
| | | | | 315/82 |
| 2016/0221491 | A1* | 8/2016 | Yagi | F21S 41/645 |
| 2017/0070711 | A1* | 3/2017 | Grundhofer | H04N 9/3185 |
| 2017/0267167 | A1* | 9/2017 | Sakata | B60Q 1/247 |
| 2018/0004020 | A1* | 1/2018 | Kunii | G08G 1/166 |
| 2018/0056854 | A1* | 3/2018 | Kunii | G08G 1/096791 |
| 2018/0118095 | A1* | 5/2018 | Kunii | B60Q 9/00 |
| 2018/0118099 | A1* | 5/2018 | Kunii | H04N 9/3141 |
| 2018/0218713 | A1* | 8/2018 | Kusanagi | B60Q 9/008 |
| 2019/0031089 | A1* | 1/2019 | Kunii | H04N 9/3188 |
| 2019/0248277 | A1* | 8/2019 | Kunii | B60Q 1/503 |
| 2019/0351820 | A1* | 11/2019 | Kunii | H04N 5/74 |
| 2019/0359118 | A1* | 11/2019 | Spenner | H05B 45/00 |
| 2020/0189448 | A1* | 6/2020 | Kunii | H04N 5/74 |
| 2020/0231085 | A1* | 7/2020 | Kunii | B60Q 1/54 |
| 2021/0155152 | A1* | 5/2021 | Kunii | H04N 9/3185 |
| 2021/0341304 | A1* | 11/2021 | Kunii | G01C 21/365 |
| 2022/0118901 | A1* | 4/2022 | El Idrissi | B60W 30/12 |
| 2022/0118902 | A1* | 4/2022 | Kunii | H04N 9/3141 |
| 2022/0121048 | A1* | 4/2022 | Kunii | G03B 21/12 |
| 2022/0244066 | A1* | 8/2022 | Kunii | B60Q 1/08 |
| 2022/0324377 | A1* | 10/2022 | Kunii | G01S 17/04 |
| 2023/0294592 | A1* | 9/2023 | Kunii | B60Q 1/0023 |
| | | | | 340/425.5 |
| 2023/0311740 | A1* | 10/2023 | Kunii | G01C 21/365 |
| | | | | 362/538 |
| 2023/0331087 | A1* | 10/2023 | Kunii | B60Q 1/503 |

OTHER PUBLICATIONS

Extended European Search Report dated Sep. 4, 2023 issued in EP 22214075.8.

English Language Abstract of KR 2022-0091243 published Jun. 30, 2022.

* cited by examiner

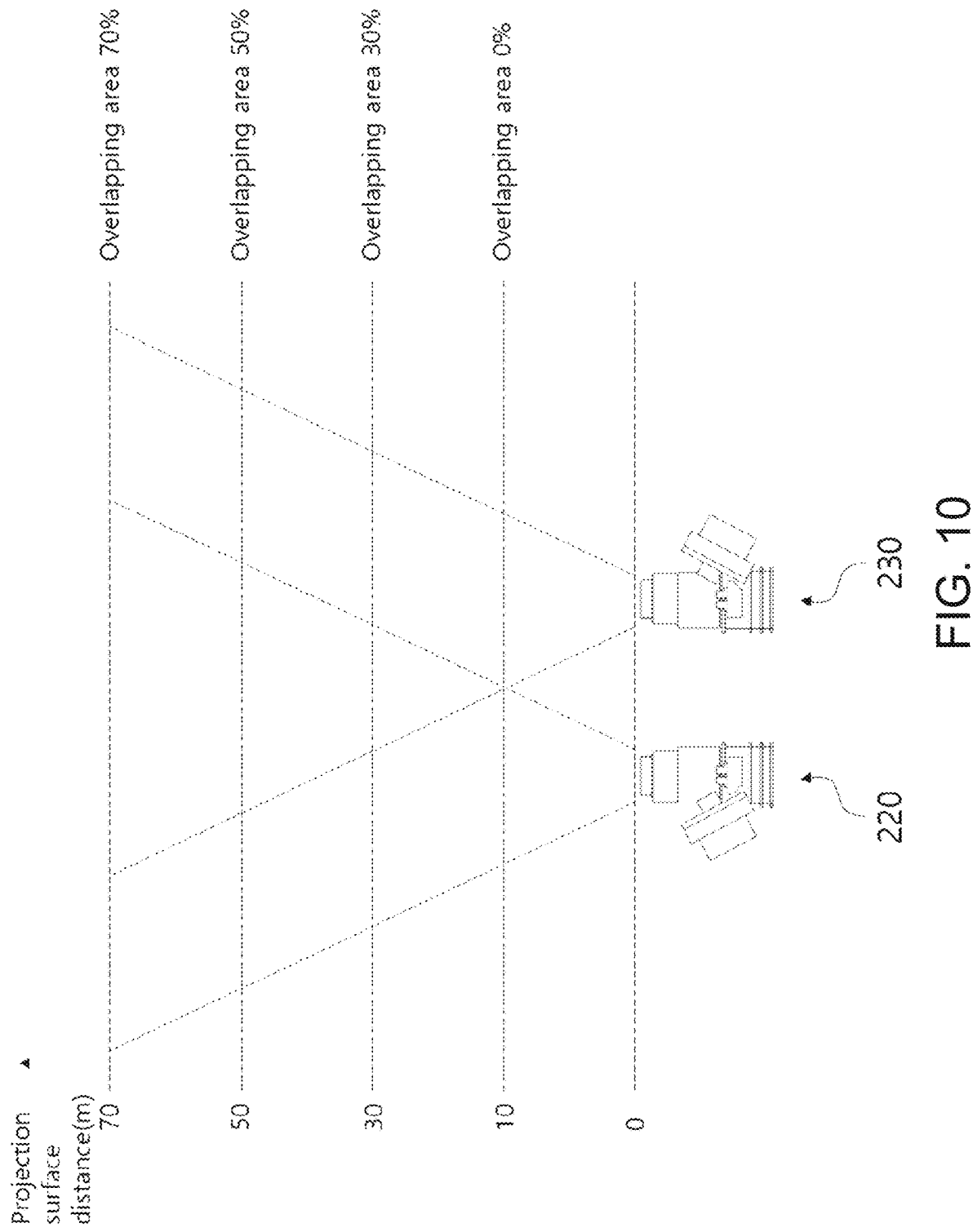

LAMP SYSTEM

CROSS-REFERENCE TO RELATED APPLICATIONS

This application claims priority under 35 U.S.C. § 119 to Korean Patent Application No. 10-2022-0109120, filed on Aug. 30, 2022, in the Korean Intellectual Property Office, the disclosure of which is incorporated herein by reference in its entirety.

TECHNICAL FIELD

The following disclosure relates to a lamp system, and more particularly, to a lamp system capable of solving a problem in which an image is overlapped in a center portion or an image is not output when one image is output using both lamps of a moving object.

BACKGROUND

A head lamp is installed in one direction of a moving object such as a vehicle and serves as a lighting function. In recent years, with the development of technology, the head lamp is not only operated for the purpose of lighting, but also serves to output a specific image to transmit meaning to drivers, pedestrians, or drivers of other moving objects.

When a lamp of a moving object outputs a specific image, each of the lamps installed on the left/right of the moving object may output an individual image, but when the lamps installed on the left/right output one image, the lamps installed on the left/right divide the image and output the image separately. Although it is ideal for each of the lamps installed on the left and right to divide the image in half and output each image, the phenomenon that the center portions of the images output from the left and right lamps may be empty or overlap due to image processing errors may occur.

RELATED ART DOCUMENT

Patent Document

Korean Patent Laid-Open Publication No. 10-2022-0091243 (Lamp for vehicle, publication date 2022 Jun. 30)

SUMMARY

An embodiment of the present invention is directed to providing a lamp system capable of improving ease of use by outputting an image without distortion when one image is divided and output from the left and right lamps, respectively.

In one general aspect, a lamp system includes a left lamp installed on a left side of a moving object in one direction to output an allocated first image, a right lamp installed on a right side of the moving object in one direction to output an allocated second image, and a control unit receiving original image information from the outside to allocate the first image and the second image to the left lamp and the right lamp, respectively, based on the original image but change and allocate an overlapping area that is an overlapping portion of the first image and the second image.

The control unit may cause the transparency of the overlapping area of the first image to be gradually lowered toward the second image, and the transparency of the overlapping area of the second image to be gradually lowered toward the first image.

When the original image has a size of x in a horizontal direction and the overlapping area has a size of y in the horizontal direction, the control unit may control the first image to have a size of $(x+y)/2$ from a left end portion of the original image to the right and the second image to have a size of $(x+y)/2$ from a right end portion of the original image to the left.

The control unit may change brightness of the overlapping area of the first image to be gradually lowered toward the second image, and change brightness of the overlapping area of the second image to be gradually lowered toward the first image.

When adjusting the brightness of the first image and the second image, the control unit may set a lower limit of the brightness of each pixel.

The control unit may increase brightness of the remaining portions except for the overlapping areas of the first image and the second image, respectively.

The control unit may double the brightness of the remaining portions except for the overlapping areas of the first image and the second image, respectively.

When adjusting the brightness of the first image and the second image, the control unit may set an upper limit of the brightness of each pixel.

The left lamp may output the first image in a left outer area and the overlapping area, and the right lamp may output the second image in a right outer area and the overlapping area, and the control unit may allocate the first image and the second image to the left and right lamps, respectively, so that individual images are output to at least one of the left outer area, the right outer area, and the overlapping area.

The control unit may allocate the first image and the second image to the left lamp and the right lamp, respectively, so that individual images are output only to the overlapping area.

The lamp system may further include a sensor sensing a distance between a projection surface of the image output from the left lamp and the right lamp and one direction of the moving object, in which the control unit adjusts an area of the overlapping area according to a distance between the projection surface sensed by the sensor and one direction of the movable body.

BRIEF DESCRIPTION OF THE DRAWINGS

FIG. 10 is a schematic graph of a change in an area of an overlapping area according to a distance between a lamp and a projection surface of the lamp system of the present invention.

DETAILED DESCRIPTION OF MAIN ELEMENTS

Figure 1:
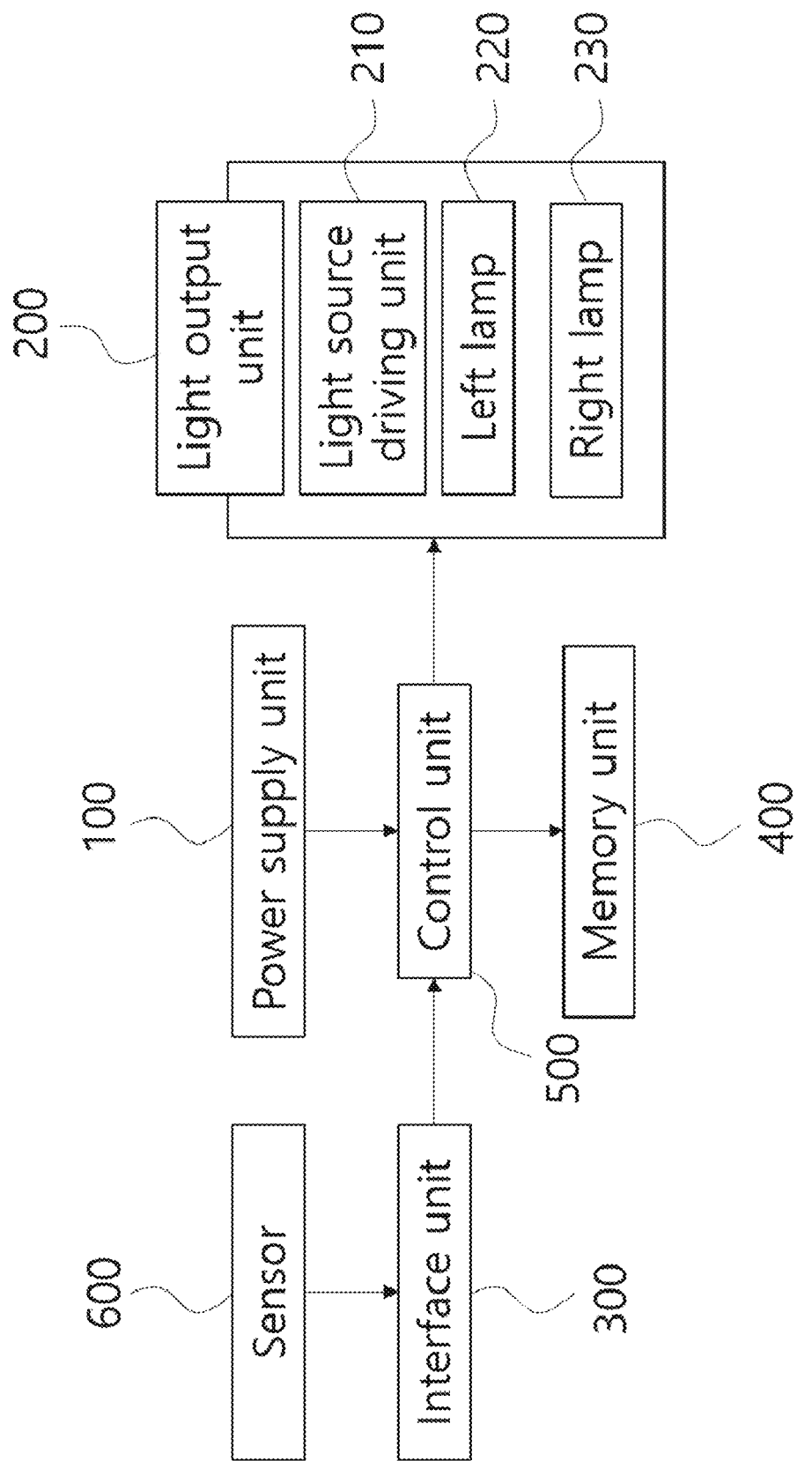
FIG. 1 is a block diagram of a lamp system according to a first embodiment of the present invention.

21: First image
22: First overlapping area
31: Second image
32: Second image
100: Power supply unit
200: Light output unit
210: Light source driving unit
220: Left lamp
230: Right lamp
300: Interface unit
400: Memory unit
500: Control unit
600: Sensor
S1: Left outer area
S2: Overlapping area
S3: Right outer area

DETAILED DESCRIPTION OF EMBODIMENTS

The above-described objects, features, and advantages of the present disclosure will become more obvious from the following detailed description provided in relation to the accompanying drawings. The following specific structural or functional descriptions are only exemplified for the purpose of explaining the embodiments according to the concept of the present invention, and the embodiments according to the concept of the present invention may be implemented in various forms and should not be construed as limited to the embodiments described herein or in the application. Since embodiments according to the concept of the present disclosure may be variously modified and may have several forms, specific embodiments will be illustrated in the accompanying drawings and will be described in detail in the present specification or application. However, it is to be understood that the present disclosure is not limited to specific embodiments, but includes all modifications, equivalents, and substitutions falling in the spirit and the scope of the present disclosure. Terms such as 'first', 'second', or the like, may be used to describe various components, but these components are not to be construed as being limited to these terms. The terms are used only to distinguish one component from another component. For example, a 'first' component may be named a 'second' component and the 'second' component may also be named the 'first' component, without departing from the scope of the present invention. It is to be understood that when one component is referred to as being "connected to" or "coupled to" another component, it may be connected directly to or coupled directly to another component or be connected to or coupled to another component with the other component interposed therebetween. On the other hand, it is to be understood that when one component is referred to as being "connected directly to" or "coupled directly to" another component, it may be connected to or coupled to another component without the other component interposed therebetween. Other expressions for describing the relationship between components, such as between and immediately between or adjacent to and directly adjacent to, etc., should be interpreted similarly. Terms used in the present specification are used only in order to describe specific embodiments rather than limiting the present disclosure. Singular forms are intended to include plural forms unless the context clearly indicates otherwise. It is to be understood that terms "include", "have", or the like, used in the present specification specify the presence of features, numerals, steps, operations, components, parts, or a combination thereof described in the present specification, but do not preclude the presence or addition of one or more other features, numerals, steps, operations, components, parts, or a combination thereof. Unless indicated otherwise, it is to be understood that all the terms used in the specification including technical and scientific terms have the same meaning as those that are generally understood by those who skilled in the art. Terms generally used and defined in a dictionary are to be interpreted as the same meanings with meanings within the context of the related art, and are not to be interpreted as ideal or excessively formal meanings unless clearly indicated in the present specification. Hereinafter, exemplary embodiments of the present invention will be described in detail with reference to the accompanying drawings. Like reference numerals proposed in each drawing denote like components.

First Embodiment

FIG. 1 is a block diagram of a lamp system according to a first embodiment of the present invention.

[As illustrated in FIG. 1, a lamp system according to a first embodiment of the present invention is used for a moving body, and may include a power supply unit 100, a light output unit 200, an interface unit 300, a memory unit 400, a control unit 500, and a sensor 600. Here, the moving object may mean various types of vehicles such as vehicles, aircraft, personal mobility, or unmanned moving objects.

The power supply unit 100 receives power from the battery of the mobile body, and supplies power to each of the remaining components, the light output unit 200, the interface unit 300, the memory unit 400, the control unit 500, and the sensor 600.

The light output unit 200 is a unit that is installed on a moving object and outputs a predetermined image of the moving object in one direction. As illustrated in FIG. 1, the light output unit 200 may include a light source driving unit 210, a left lamp 220, and a right lamp 230.

The light source driving unit 210 is a unit that drives the left lamp 220 and the right lamp 230, and may be implemented as a kind of electronic device. The left lamp 220 and the right lamp 230 may be a high-resolution image output device such as a digital mirror device (DMD) or an HD Micro LED.

The left lamp 220 and the right lamp 230 are installed on the left and right sides of the moving object in one direction, respectively, and output a predetermined image in one direction. The image output from the left lamp 220 is referred to as a first image, and the image output from the right lamp 230 is referred to as a second image.

The interface unit 300 serves to receive sensor information from the moving object and transmit the lamp state to the moving object.

The memory unit 400 serves to store a video mage output from the optical output unit 200.

The control unit 500 may store the video image in the memory unit 400, receive information from the interface unit 300, and transmit a control signal to the light source driver 210.

The sensor 600 serves to sense a distance between the moving object, more specifically, the light output unit 200 installed on the moving object and a projection surface.

In the present invention, the control unit 500 transmits the control signal to the light source driving unit 210 to allocate the first image and the second image to the left lamp 220 and the right lamp 230, respectively. More specifically, the control unit 500 receives original image information finally output from the outside, generates information corresponding to the first image and the second image, respectively, based on the original image information, and allocates the generated information to the left lamp 220 and the right lamp 230. The left lamp 220 outputs the first image, and the right lamp 230 outputs the second image to finally output the original image in one direction of the moving object.

As described in the background art, when the first image is output from the left lamp 220 and the second image is output from the right lamp 230, there is a portion where the first image and the second image overlap each other and image distortion may occur in this portion. To prevent this, the control unit 500 generates first image information and second image information based on the original image information, respectively, but changes an overlapping area, which is a portion where the first image and the second image overlap with each other. Thereafter, the control unit 500 allocates the first image with the changed overlapping area to the left lamp 220, and allocates the second image with the changed overlapping area to the right lamp 230.

Figure 2A:
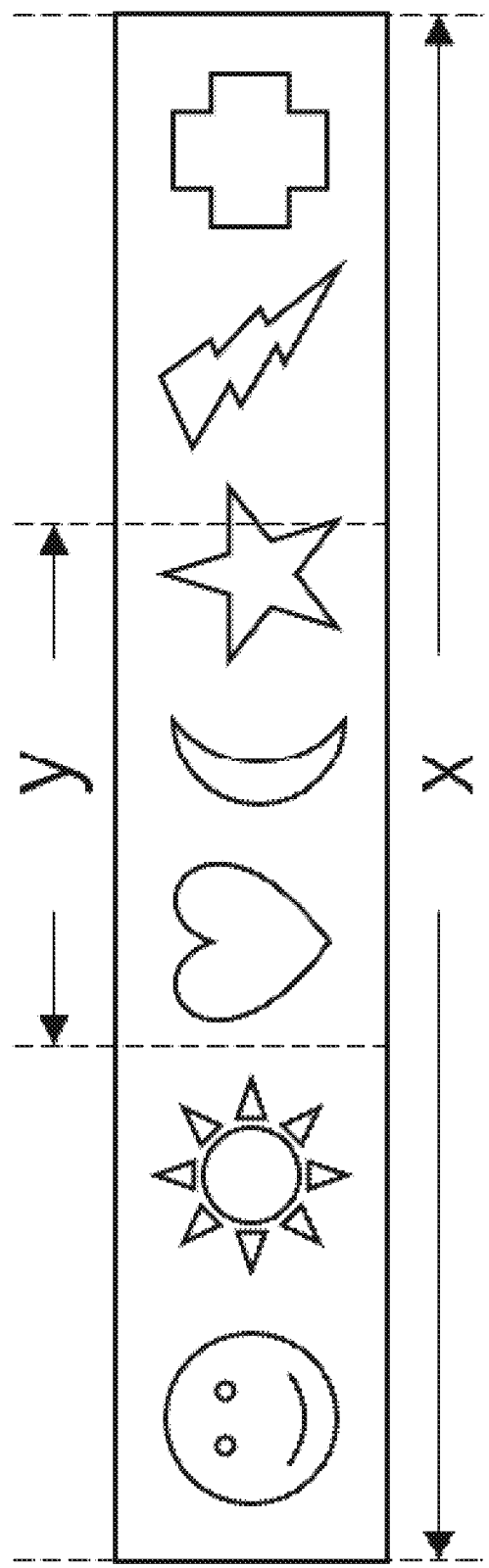
FIG. 2A is a schematic diagram of an original image output from the lamp system according to the first embodiment of the present invention.
Figure 2B:
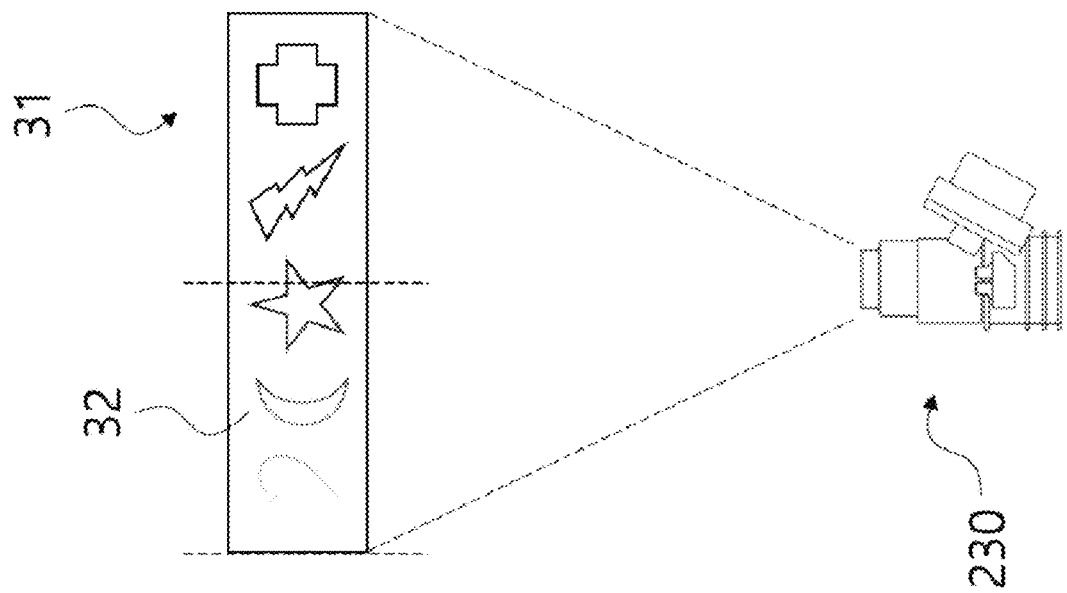
FIG. 2B is a schematic diagram of a first image and a second image output from each of a left lamp and a right lamp of the lamp system according to the first embodiment of the present invention.

FIG. 2A is a schematic diagram of the original image output from the lamp system according to the first embodiment of the present invention, and FIG. 2B is a schematic diagram of the first image and the second image output from the left lamp and the right lamp, respectively, of the lamp system according to the first embodiment of the present invention.

As illustrated in FIG. 2A, there is the overlapping area in the center of the original image. The overlapping area is a portion overlapping with each other when the left lamp 220 and the right lamp 230 output images in one direction of the moving object, respectively.

In FIG. 2B, the first image 21 and the second image 31 output from the left lamp 220 and the right lamp 230, respectively, are illustrated, and the first image 21 includes a first overlapping area 22, and the second image 31 includes a second overlapping area 32. The transparency of the first overlapping area 22 is lowered from a left end portion to a right end portion. More specifically, the transparency of the first overlapping area 22 is gradually lowered from the left end portion to the right end portion. The transparency of the second overlapping area 32 is lowered from the right end portion to the left end portion. More specifically, the transparency of the second overlapping area 32 is gradually lowered from the right end portion to the left end portion. In the present invention, when the first image 21 is output from the left lamp 220 and the second image 31 is output from the right lamp 230, since the first overlapping area 22 and the second overlapping area 32 overlap each other, the transparency of the corresponding portion is adjusted so that the finally output image becomes natural.

The transparency will be described in more detail. In general, when outputting the image from the lamp, there are a method of outputting only R/G/B and a method of outputting R/G/B/A as a method of expressing colors. In this embodiment, R/G/B/A is output. Among them, R/G/B is brighter as the value of each pixel is larger, and darker as the value of each pixel is smaller. A is an element that means transparency (alpha), and the transparency varies depending on the size of the A value, and the transparency is adjusted by adjusting the A value among the R/G/B/A.

Figure 3A:
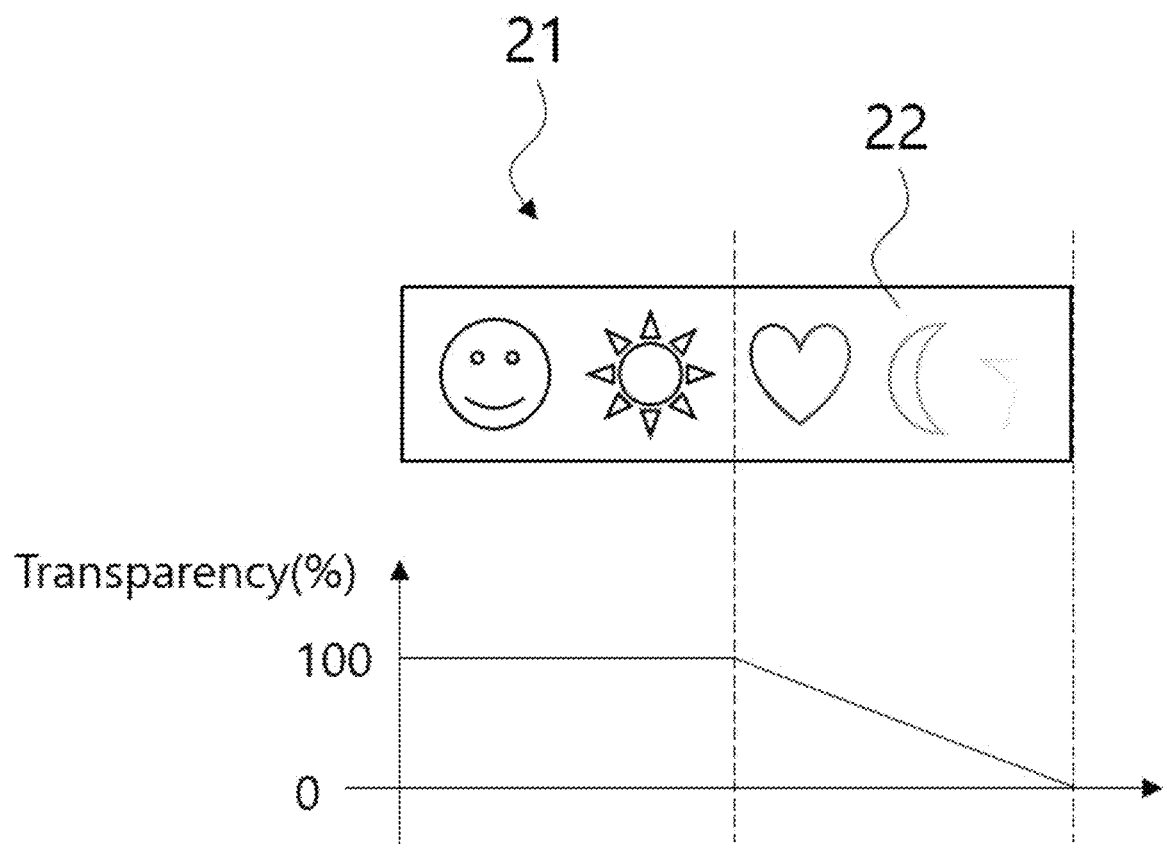
FIG. 3A is a graph of the first image output from the lamp system according to the first embodiment of the present invention and the transparency of the image.
Figure 3B:
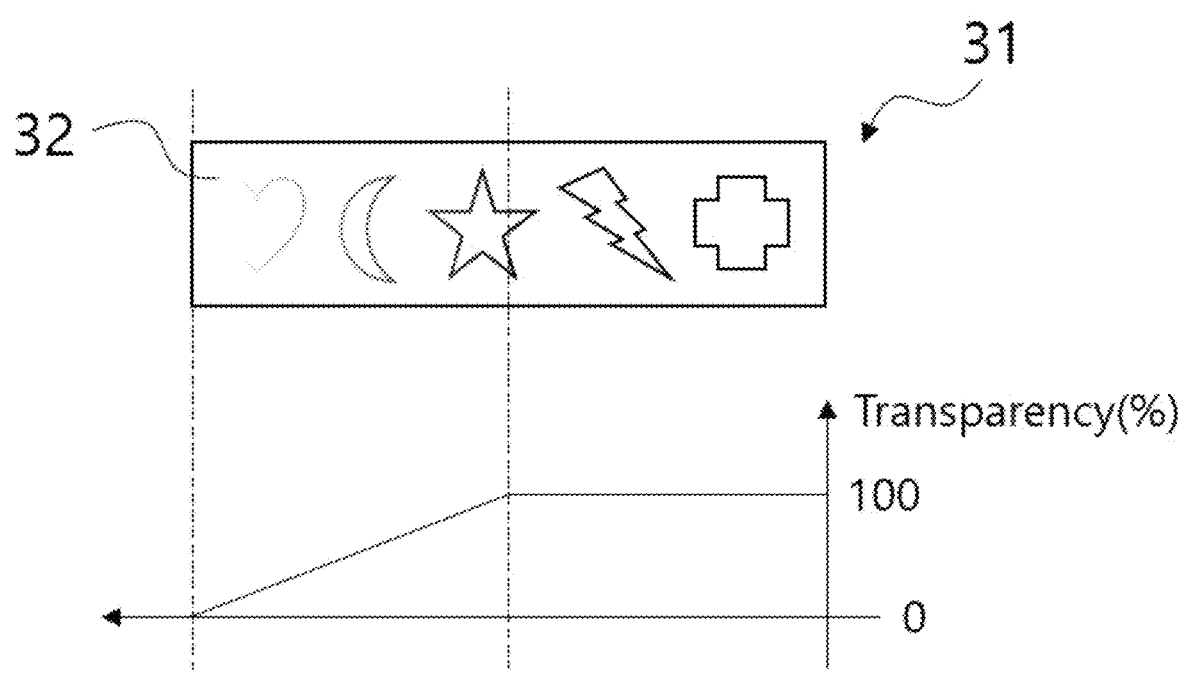
FIG. 3B is a graph of the second image output from the lamp system according to the first embodiment of the present invention and the transparency of the image.

FIG. 3A is a graph of the first image output from the lamp system according to the first embodiment of the present invention and the transparency of the image, and FIG. 3B is a graph of the second image output from the lamp system according to the first embodiment of the present invention and the transparency of the image.

Figure 4:
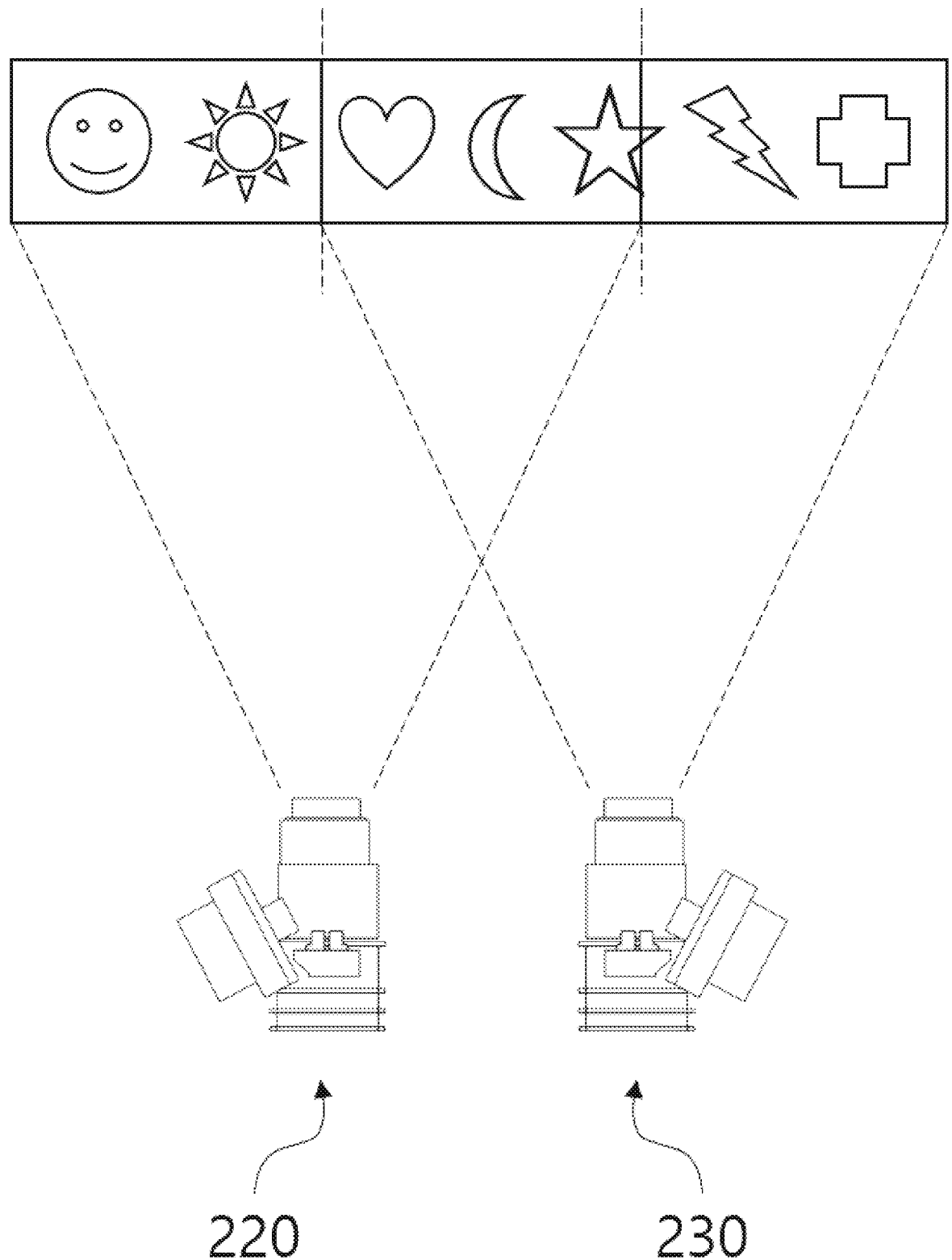
FIG. 4 is a schematic diagram of an original image output from the lamp system according to the first embodiment of the present invention.

As illustrated in FIG. 3A, the first overlapping area 22 of the first image 21 output from the left lamp 220 is gradually lowered in transparency toward the right end portion, and finally has a transparency of 0%. Similarly, as illustrated in FIG. 3B, the second overlapping area 32 of the second image 31 output from the right lamp 230 is gradually lowered in transparency toward the left end portion, and finally has the transparency of 0%. As illustrated in FIG. 4, the control unit 500 of the present invention adjusts the transparency of the first overlapping area 22 and the second overlapping area 32 as described above, and then the first image 21 and the second image 31 are allocated to the left lamp 220 and the right lamp 230, respectively, so the finally output image looks natural.

Figure 2B:
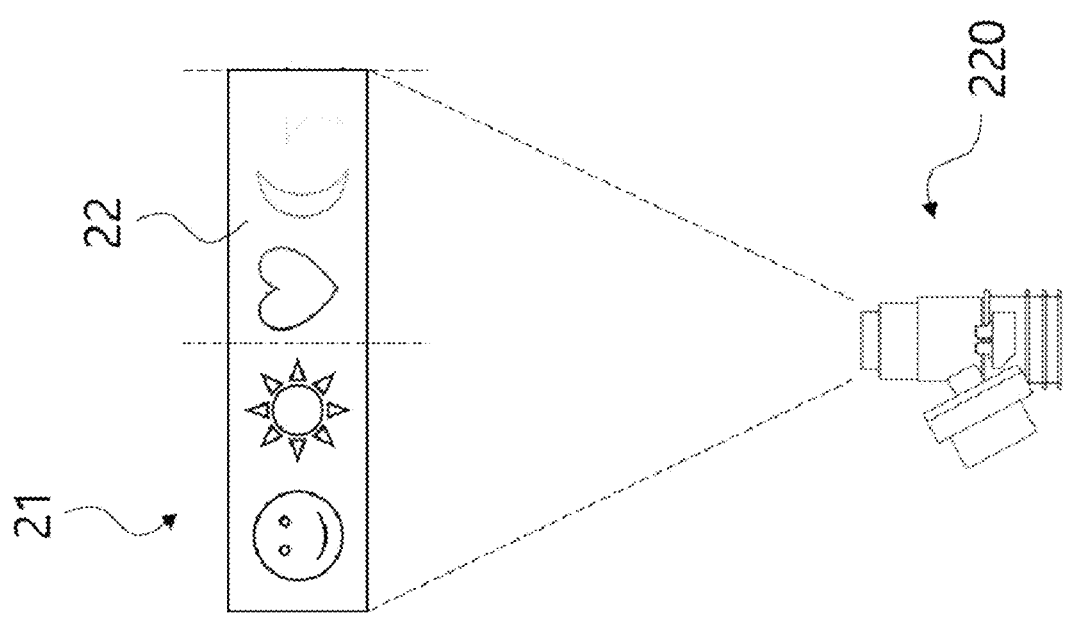

Referring to FIG. 2, when the original image has a length x in a horizontal direction, the length of the overlapping area may be pre-stored to have a length of y. The control unit 500 may divide the first image and the second image using the length x of the original image and the length y of the overlapping area. Since the overlapping area exists symmetrically with respect to the center of the original image, the horizontal lengths of the first image and the second image may be calculated through a simple calculation. The horizontal length of the first image and the second image is (x+y)/2, and the control unit 500 may divide the original image into the first image and the second image by using the horizontal length x of the original image and the horizontal length y of the overlapping area, and the transparency of the first overlapping area of the first image and the second overlapping area of the second image may be adjusted to allocate the first image and the second image to the left lamp 220 and the right lamp 230, respectively. The horizontal length x of the original image and the horizontal length y of the overlapping area may be used as a unit of length such as mm, or may be used as a unit of pixel which is a resolution. The same unit may be used for x and y.

Figure 5:
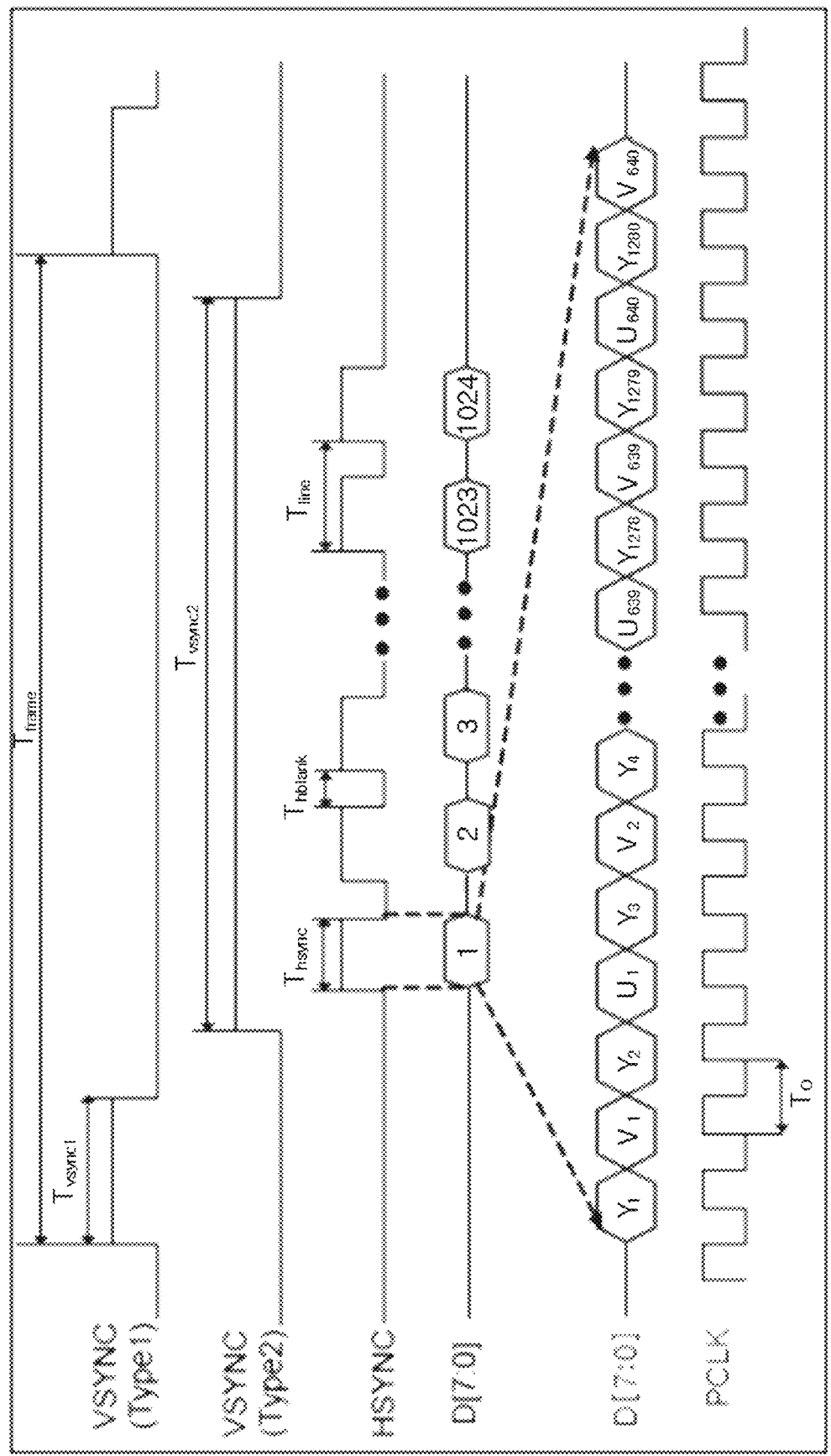
FIG. 5 is a schematic diagram of a signal used for the image output of the lamp system according to the first embodiment of the present invention.

FIG. 5 is a schematic diagram of a signal used for the image output of the lamp system according to the first embodiment of the present invention.

R/G/B data illustrated in FIG. 5 means a combination of R, G, and B colors for displaying one pixel as a color, PCLK means timing for outputting one pixel, HSYNC means timing to output one row, and VSYNC means timing to output one page. In the present invention, the control unit 500 divides the HSYNC, which determines timing of horizontal data, into left and right, and transmits the HSYNC to the left lamp 220 and the right lamp 230, respectively, to allocate the first image and the second image.

Second Embodiment

Figure 6:
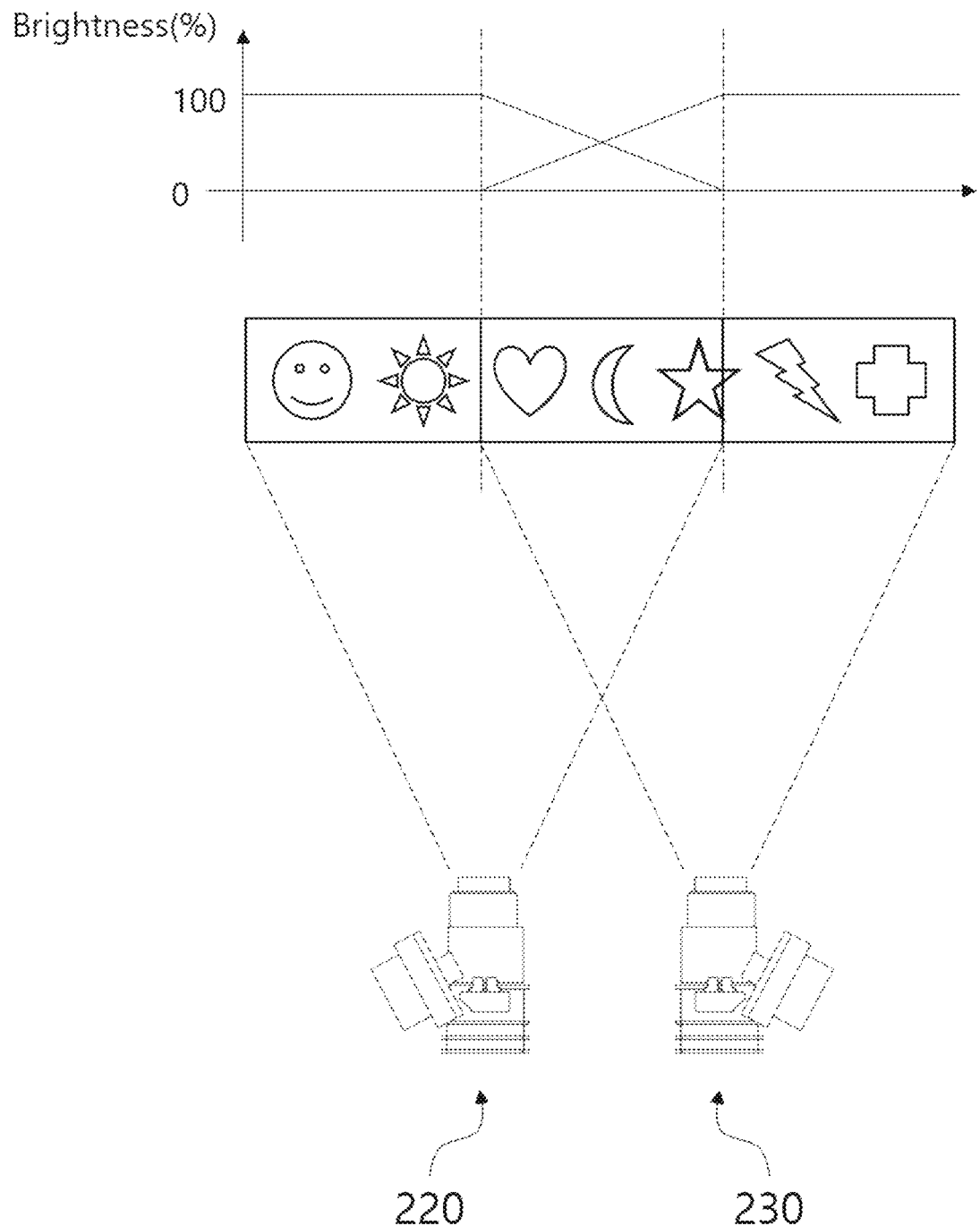
FIG. 6 is a graph of brightness of a first image and a second image of a lamp system according to a second embodiment of the present invention.

FIG. 6 is a graph of brightness of a first image and a second image of a lamp system according to a second embodiment of the present invention.

When there is no separate adjustment of brightness in a portion where the first image 21 and the second image 31 overlap with each other, the brightness in the portion doubles brightness in the other portion in which the first image 21 and the second image 31 do not overlap with each other, which may lead to the image distortion. To prevent this, as illustrated in FIG. 6, the control unit 500 gradually decreases the brightness of the first overlapping area 22 of the first image 21 from the left end portion to the right end portion, gradually decreases the brightness of the second overlapping area 32 of the second image from the right end portion to the left end portion, and then, allocates the first image 21 and the second image 31 to the left lamp 220 and the right lamp 230, respectively. When the brightness in the overlapping area is adjusted in this way, the brightness in the overlapping area becomes the same as the brightness in the other portions.

In the present embodiment, an image is expressed by outputting the R/G/B pixels, and the adjustment of the brightness is to adjust numerical values of each pixel. In general, each pixel has a value between 0 and 255, where 0 means black and 255 means white.

Third Embodiment

Figure 7:
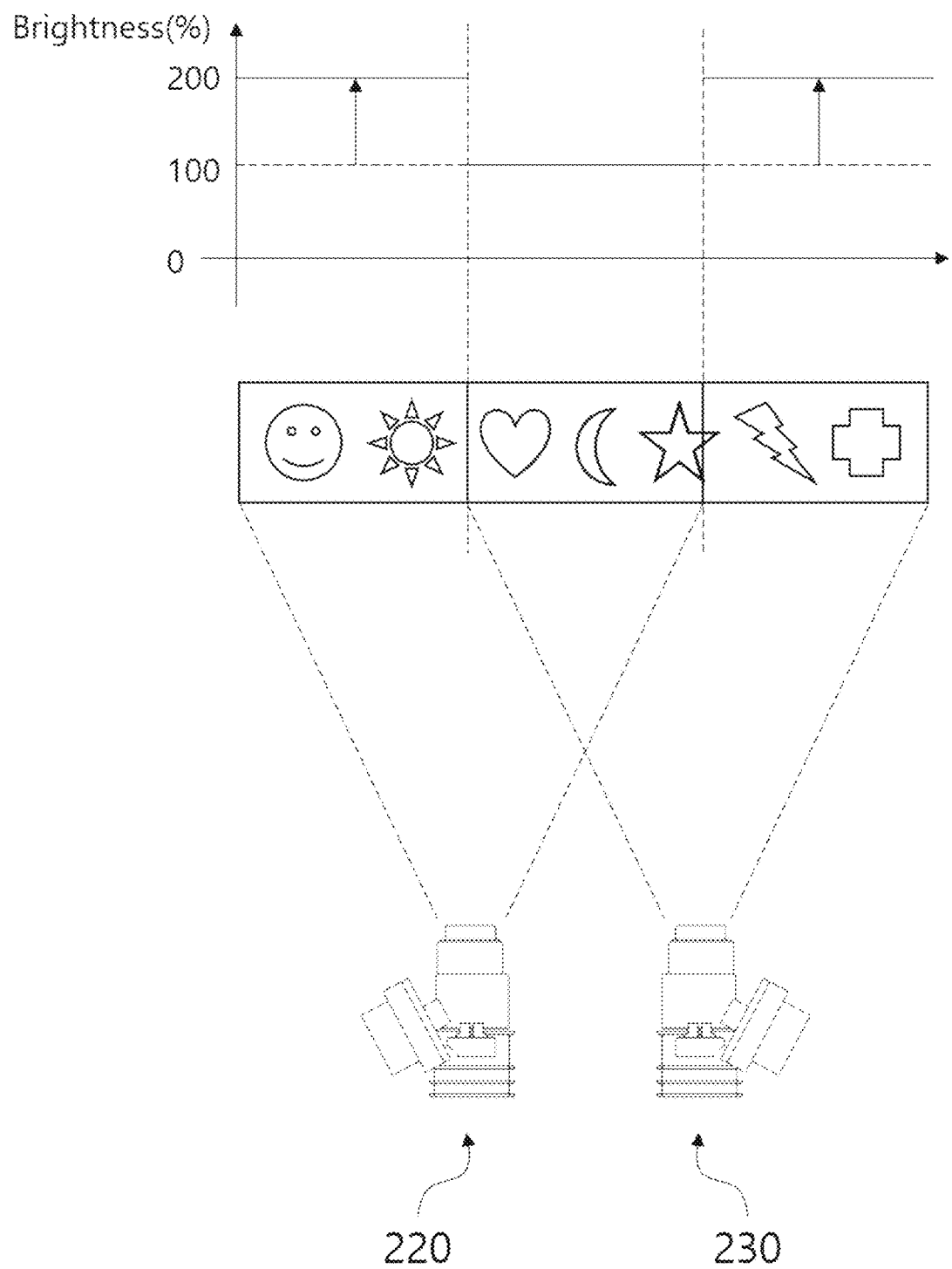
FIG. 7 is a graph of brightness of a first image and a second image of a lamp system according to a third embodiment of the present invention.

FIG. 7 is a graph of brightness of a first image and a second image of a lamp system according to a third embodiment of the present invention.

In a lamp system according to a third embodiment of the present invention, brightness of non-overlapping area may be adjusted instead of adjusting brightness of an overlapping area. Since the overlapping area is a portion where two images overlap with each other, the brightness in the overlapping area doubles that of the other portions. Accordingly, the control unit 500 doubles the brightness of the remaining portions except for the overlapping area in the first image and the second image, respectively, and then, allocates the first image and the second image to the left lamp 220 and the right lamp 230, respectively, so the brightness of the image projected in one direction of the moving object may be uniform as a whole.

In the lamp system according to the second and third embodiments of the present invention, the brightness of the overlapping area or the non-overlapping area decreases or increases. Increasing/decreasing the brightness means adjusting the brightness set for each pixel. The brightness of each pixel may have an upper limit and a lower limit, and the brightness of each pixel may be adjusted only in a range between the upper limit and the lower limit.

Fourth Embodiment

Figure 8:
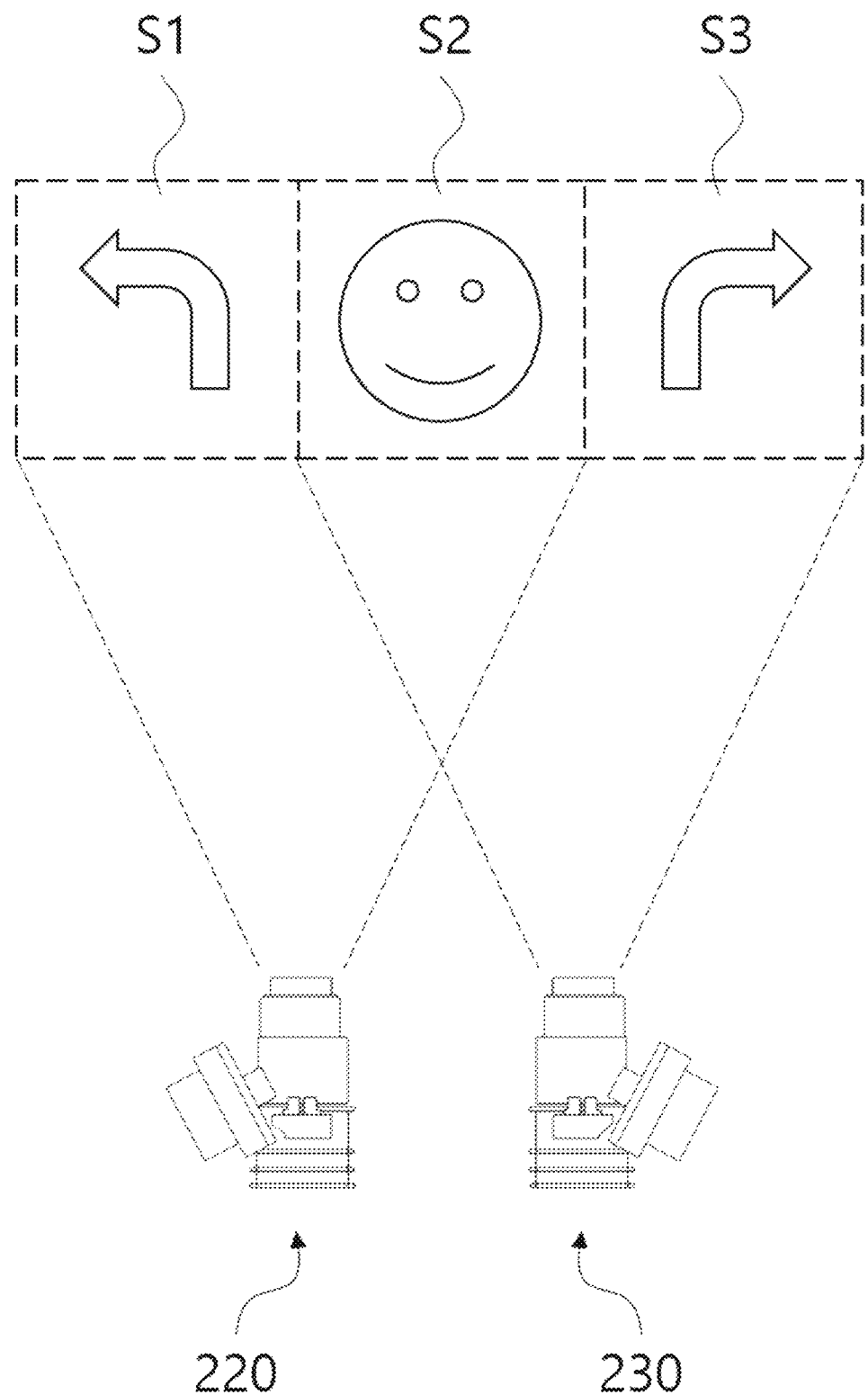
FIG. 8 is a schematic diagram of an original image output from a lamp system according to a fourth embodiment of the present invention.

FIG. 8 is a schematic diagram of an original image output from a lamp system according to a fourth embodiment of the present invention.

As described above, even if the image distortion between the overlapping area and the remaining part is minimized by adjusting the transparency or brightness in the overlapping area, the image distortion may occur in some cases. In a lamp system according to a fourth embodiment of the present invention, in order to solve this problem, an image area output in one direction of a moving object as illustrated in FIG. 8 is divided into a left outer area S1, an overlapping area S2, and a right outer area S3, and then, individual images may be output to the left outer area S1, the overlapping area S2, and the right outer area S3, respectively. In FIG. 8, individual images are output to the left outer area S1, the overlapping area S2, and the right outer area S3, respectively, but the present invention is not limited thereto, and there may also be an embodiment in which individual images are output to at least one of the left outer area S1, the overlapping area S2, and the right outer area S3.

Figure 9:
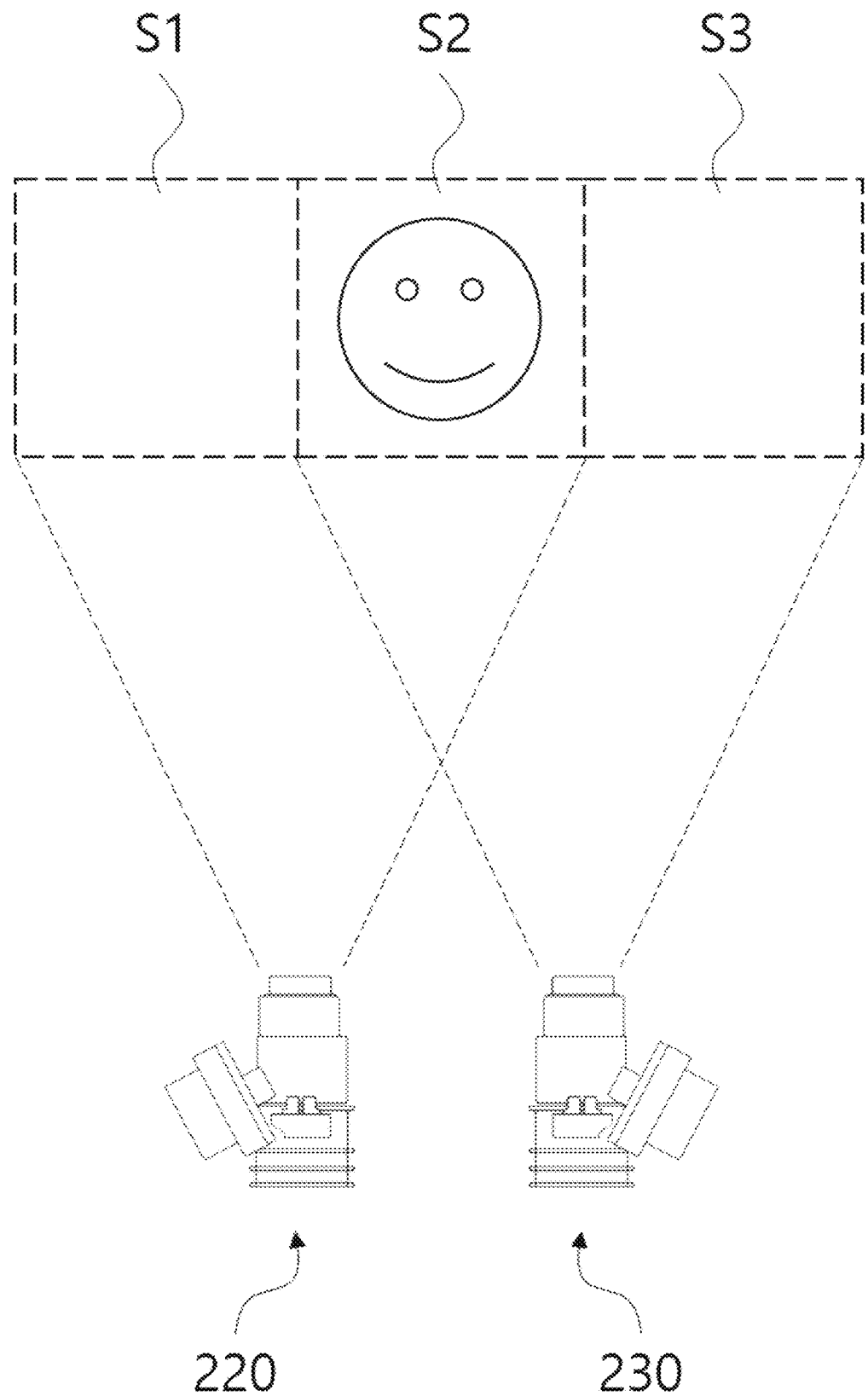
FIG. 9 is a schematic diagram in which an image is output only to an overlapping area in the lamp system according to the fourth embodiment of the present invention.

FIG. 9 is a schematic diagram in which an image is output only to an overlapping area in the lamp system according to the fourth embodiment of the present invention.

In particular, there may also be an embodiment in which the control unit 500 may allocate the first image and the second image to the left lamp 220 and the right lamp 230 without separately adjusting transparency or brightness for the overlapping area of the image projected from the overlapping area S2 to make the brightness of the image output from the overlapping area S2 double that of the existing one, thereby securing the visibility of the image projected into the overlapping area S2.

Fifth Embodiment

The overlapping area of the first image output from the left lamp 220 and the second image output from the right lamp 230 may vary depending on a distance between the moving object and the projection surface on which the image is projected in one direction of the moving object.

FIG. 10 is a schematic graph of a change in an area of an overlapping area according to a distance between a lamp and a projection surface of the lamp system of the present invention.

As illustrated in FIG. 10, it may be seen that, as the distance between the lamp and the projection surface increases, the area of the overlapping area increases. In this case, the area setting of the overlapping area set by the control unit 500 should also be changed. Accordingly, the sensor 600 included in the present embodiment senses the distance between the lamp and the projection surface, and the control unit 500 changes the horizontal length of the overlapping area according to the distance between the lamp and the projection surface, so the transparency or brightness of each overlapping area of the first image 21 and the second image 31 may be changed, or the brightness of portions other than the overlapping area may be adjusted. The present invention may further include a storage unit (not illustrated) for storing information on the horizontal length of the overlapping area according to the distance between the lamp and the projection surface.

The sensor 600 may sense the distance between the lamp and the projection surface through various methods. For example, the sensor 600 may sense the distance between the lamp and the projection surface by sensing the angle at which each of the left lamp 220 and the right lamp 230 projects an image and the inclination of the ground.

As described above, according to the lamp system of the present invention, by allowing a control unit to change an overlapping area which is an overlapping portion of a first image and a second image allocated to a left lamp and a right lamp, respectively, it is possible to naturally output an original image finally output.

Although preferred embodiments of the present invention have been described above, the embodiments disclosed in the present invention are only for explaining, not limiting, the technical spirit of the present invention. Accordingly, the technical spirit of the present invention includes not only each disclosed embodiment, but also a combination of the disclosed embodiments, and further, the scope of the technical spirit of the present invention is not limited by these embodiments. In addition, many modifications and alterations of the present disclosure may be made by those skilled in the art to which the present disclosure pertains without departing from the spirit and scope of the accompanying claims. In addition, it is to be considered that all of these modifications and alterations fall within the scope of the present disclosure.

What is claimed is:

1. A lamp system, comprising:
a plurality of left lamps adapted to be installed on a left side of a moving object to output an allocated first image;
a plurality of right lamps adapted to be installed on a right side of the moving object to output an allocated second image; and
a control unit adapted to generate a first image and a second image, which are images for the left lamps and the right lamps, respectively, based on original image information,
wherein the control unit is adapted to generate the first image and the second image to include an overlapping area where the first image and the second image overlap with each other,
wherein the control unit is adapted to cause a transparency of the overlapping area of the first image to be gradually lowered toward the second image, and a transparency of the overlapping area of the second image to be gradually lowered toward the first image.

2. The lamp system of claim 1, wherein, when the original image has a size of x in a horizontal direction and the overlapping area has a size of y in the horizontal direction, the control unit is adapted to control the first image to have a size of (x+y)/2 from a left end portion of the original image to the right and the second image to have a size of (x+y)/2 from a right end portion of the original image to the left.

3. The lamp system of claim 1, wherein the control unit is adapted to change a brightness of the overlapping area of the first image to be gradually lowered toward the second image, and change a brightness of the overlapping area of the second image to be gradually lowered toward the first image.

4. The lamp system of claim 3, wherein, when adjusting the brightness of the first image and the second image, the control unit is adapted to set a lower limit of the brightness of each pixel.

5. The lamp system of claim 1, wherein the control unit is adapted to increase brightness of one or more remaining portions except for the overlapping areas of the first image and the second image, respectively.

6. The lamp system of claim 5, wherein the control unit is adapted to double the brightness of the remaining portions except for the overlapping areas of the first image and the second image, respectively.

7. The lamp system of claim 5, wherein, when adjusting the brightness of the first image and the second image, the control unit is adapted to set an upper limit of the brightness of each pixel.

8. The lamp system of claim 1, wherein the left lamps output the first image in a left outer area and the overlapping area, and the right lamps output the second image in a right outer area and the overlapping area, and the control unit is adapted to allocate the first image and the second image to the left and right lamps, respectively, so that individual images are output to at least one of the left outer area, the right outer area, and the overlapping area.

9. The lamp system of claim 8, wherein the control unit is adapted to allocate the first image and the second image to the left lamps and the right lamps, respectively, so that individual images are output only to the overlapping area.

10. The lamp system of claim 1, further comprising:
a sensor adapted to sense a distance between a projection surface of the image output from the left lamps and the right lamps and the moving object,
wherein the control unit is adapted to adjust an area of the overlapping area according to the distance between the projection surface sensed by the sensor and one direction of the moving object.

* * * * *